July 26, 1955  J. P. WALKER ET AL  2,713,919
OIL WELL EMULSION-TREATING APPARATUS AND METHOD
Filed March 23, 1949  7 Sheets-Sheet 1

Fig. 1

Inventors
Jay P. Walker
Clarence O. Glasgow
Alex W. Francis Jr.
By Ahley & Ahley July 26, 1955   J. P. WALKER ET AL   2,713,919
OIL WELL EMULSION-TREATING APPARATUS AND METHOD
Filed March 23, 1949   7 Sheets-Sheet 5

Jay P. Walker
Clarence O. Glasgow
Alex W. Francis Jr.
INVENTORS

July 26, 1955  J. P. WALKER ET AL  2,713,919
OIL WELL EMULSION-TREATING APPARATUS AND METHOD
Filed March 23, 1949  7 Sheets-Sheet 6

Jay P. Walker
Clarence O. Glasgow
Alex W. Francis Jr.
INVENTORS

July 26, 1955 J. P. WALKER ET AL 2,713,919
OIL WELL EMULSION-TREATING APPARATUS AND METHOD
Filed March 23, 1949 7 Sheets-Sheet 7

Jay P. Walker
Clarence O. Glasgow
Alex W. Francis Jr.
INVENTORS

BY Ahley & Ahley

United States Patent Office 2,713,919
Patented July 26, 1955

2,713,919

OIL WELL EMULSION-TREATING APPARATUS AND METHOD

Jay P. Walker, Clarence O. Glasgow, and Alex W. Francis, Jr., Tulsa, Okla., assignors to National Tank Company, Tulsa, Okla., a corporation of Nevada Application March 23, 1949, Serial No. 83,054

21 Claims. (Cl. 183—2.7)

This invention relates to new and useful improvements in oil well emulsion-treating apparatus and method.

One object of the invention is to provide an improved emulsion treater wherein the emulsion is caused to flow in a general horizontal path, its direction of flow being reversed during certain stages, also wherein free water is extracted, the emulsion partially broken, and additional water precipitated before the major breaking operation, whereby efficient and convenient treating is accomplished and the volume of liquid to be heated is reduced.

Another object of the invention is to provide an improved horizontal treater having a more efficient filtering and coalescing section wherein, the oil is effectively filtered, not only in the oil stratum, but in the water stratum as well and especially wherein, fine particles of oil suspended in the water stratum will be coalesced and caused to ascend into the oil stratum, thus cleaning the water to such an extent that it will be discharged with less oil contamination than has been previously attained.

Still another object of the invention is to provide a horizontal treater wherein the oil and water strata are of such length that the clean oil may be taken off at one end of the oil stratum and the hot oil delivered to the other end of said oil stratum, whereby the major portion of the gas will be released at such a distance from the oil outlet as to assure quiescense throughout the major portion of the length of the oil stratum and thereby reducing agitation of the oil stratum and better handling of both the oil and the released gas.

A further object of the invention is to provide an improved emulsion-treating apparatus wherein, the hydrocarbon and water vapors, which are evolved during the heating operation, are caused to pass in heat exchange relation with the influent stream from the well, after free gas has been separated from said stream and prior to free water removal.

A still further object of the invention is to provide an improved emulsion-treating apparatus wherein the hydrocarbon and water vapors, which have been evolved during the heating operation, are passed in heat exchange relation with the influent stream from the well, prior to the separation of free gas from said stream and prior to free water removal.

Another object of the invention is to provide an improved emulsion-treating apparatus wherein free water extracted from the influent well stream, prior to heating, is commingled with the water extracted from the emulsion, during and after the heating stage, thus reducing the temperature of the water settling from the heating stage while such waters are being filtered.

Still another object of the invention is to provide an improved emulsion treater wherein the rich gases or vapors, evolved during the major breaking phase, are conducted through a condenser in heat exchange relation with the influent emulsion mixture, which is carried through said condenser in a segregated path at a much lower temperature, whereby these hot gases or vapors, and particularly the heavier or richer ends, are condensed and delivered to the treated oil, and thus conserved.

An important object of the invention is to provide an improved emulsion treater involving an elongate horizontal tank having therein novel treating elements and which tank may be readily transported and unloaded in operating position, requiring no upending or guy cables.

A further object of the invention is to provide an improved horizontal emulsion treater, having therein a filtering zone and so arranged, that the emulsion and free oil must travel in a substantially horizontal plane or lateral direction in accordance with their specific gravities and water which is released from such flowing emulsion may mix with the free water and be discharged therewith through a common outlet.

Another object of the invention is to provide a treater having a horizontal tank divided into a forward water separating and emulsion breaking section and a rearward filtering section, with a heat exchanger in the forward section for processing the evolved gases to recover condensable hydrocarbon components.

An important object of the invention is to provide an improved horizontal emulsion treater having a wire therein, whereby a treating area is formed forwardly of the weir and an oil accumulation chamber with an oil outlet is formed rearwardly of said weir, with control means for maintaining a normal oil level in the accumulation chamber a substantial distance below the weir for the purposes of stabilizing the oil and water zones in the treater, compensating an overflow or underflow of liquids into the treater and holding a predetermined upper oil level in said treater.

A further object of the invention is to provide a horizontal treater having a heating chamber with a heater therein and a medium preferably above the oil level for flowing evolved gases and vapors in a segregated path therethrough in heat exchange with the influent liquid stream which is being conducted in the heating chamber, whereby vapors, both hydrocarbon and water, are condensed and the condensates discharged in the treater; the hydrocarbon, as well as water, condensates being admixed with the treated oil.

Another object of the invention is to provide a horizontal treater having a forward treating section provided with means whereby, the influent stream is admitted and caused to flow through a generally circuitous path during which flow it is gradually heated, free water is settled out, the emulsified oil is trapped and spread to precipitate water therefrom to reduce the flow to a low water-to-oil ratio and said flow is then heated while flowing generally longitudinally of a heater, so as to effectively and efficiently break the emulsion.

Still another object of the invention is to provide an improved horizontal treater which has an exterior condenser having connection for conducting hot gases and vapors from the treater therethrough in a segregated path in heat exchange relation to the influent stream to condense vapors and wherein, the residual gases and vapors are carried through an exterior gas separator connected with the treater; said exterior condenser taking the place of the interior condenser and the influent stream being either preheated or not preheated; or wherein the influent stream is first admitted to the exterior condenser, is then conducted through a preheater and then discharged into the exterior gas separator.

Still another object of the invention is to provide an improved emulsion treater provided with an exterior condenser and a preheater wherein the influent stream is passed through the preheater in heat exchange relation with the clean hot oil and then carried through the condenser, the condensates from the condenser being admixed with the clean oil discharged from the preheater;

or wherein the influent stream is first passed through the condenser, thence through the preheater and then to the gas separator.

A further object of the invention is to provide an improved horizontal emulsion treater having a heat exchanger located in the separating and stratifying chamber, connected to the influent inlet of the gas separator and either receiving the influent stream direct or through the exterior preheater for treating foamy oils; or having an exterior filtering or defoaming container connected in the conductor from the internal heat exchanger to the gas separator for treating extremely foamy oils.

Another object of the invention is to provide an improved treating method wherein the influent emulsion stream is processed to obtain the results and advantages heretofore set out.

Constructions designed to carry out the invention will be hereinafter described together with other features of the invention.

The invention will be more readily understood from a reading of the following specification and by reference to the accompanying drawings, wherein examples of the invention are shown, and wherein:

In the drawings, the number 10 designates an elongate, horizontal tank which is preferably cylindrical in cross-section and has crowned or dished heads 11 and 12, respectively, at its ends. The term "horizontal" as used herein is intended to refer to an elongate tank disposed on its side and is not exact since the tank may be slightly inclined.

The tank is suitably supported on a base, such as a skid 13 having transverse saddles or bolsters 14 fastened on its upper side, in which saddles the tank is seated. The saddles may be welded on the skid and the tank may be welded in the saddles, whereby said base and tank may be transported as an integral unit.

Figure 1:
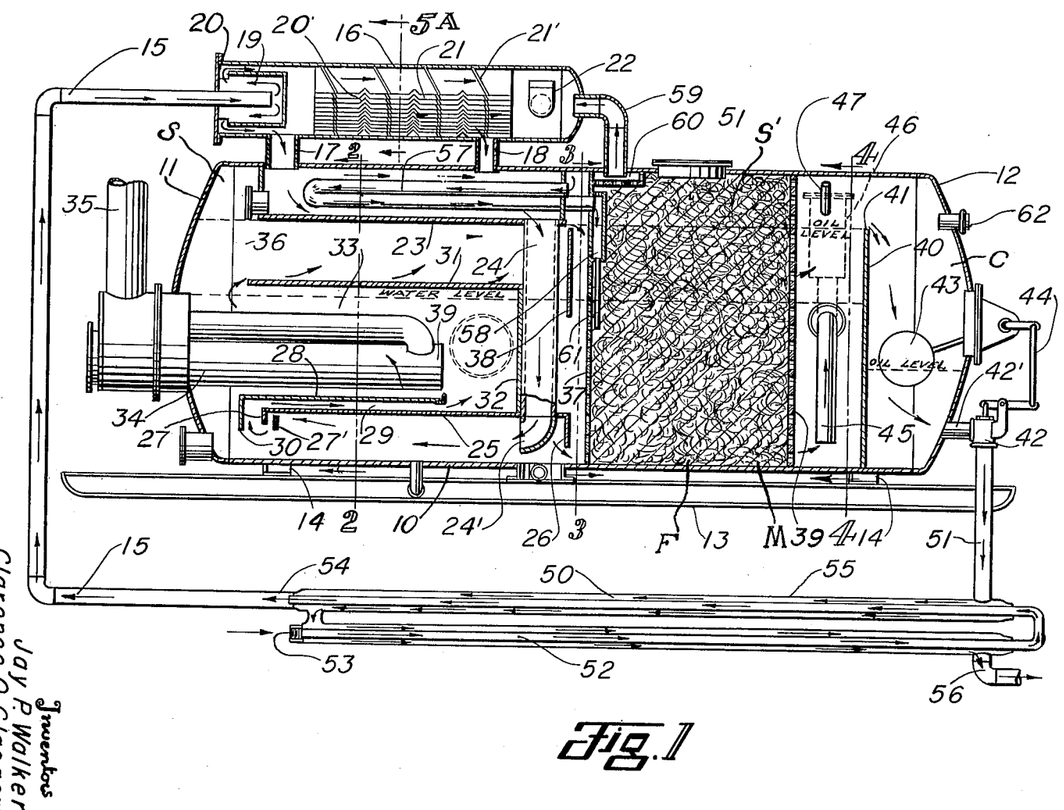
Fig. 1 is a longitudinal sectional view of a horizontal emulsion treater constructed in accordance with the invention.

The heating is done in the forward part of the tank which is at the left hand of Fig. 1. The separation of gas and vapors from the liquids occurs throughout the tank. The condensation of hydrocarbon vapors and the conservation of the condensates is maintained throughout the tank. The well stream either preheated or not preheated is introduced, by way of an inlet pipe 15, into one end of a relatively small, horizontal gas separator 16. The particular structure of this gas separator may vary considerably and the invention is not to be limited thereto.

The gas separator is cylindrical in cross-section and is disposed on top of the forward portion of the tank, being supported and attached by nipples 17 and 18, respectively. Within the forward end of the separator a cylindrical shield 19 is concentrically mounted and surrounds the inlet pipe 15. The well stream discharges against the flat head of the shield, whereby it is spread, and its direction of flow is reversed in the shield. This discharge of the well stream tends to reduce the velocity of the components, as well as permitting the gas and vapors to separate from the liquids.

Figures 2, 3, 4, 5A:
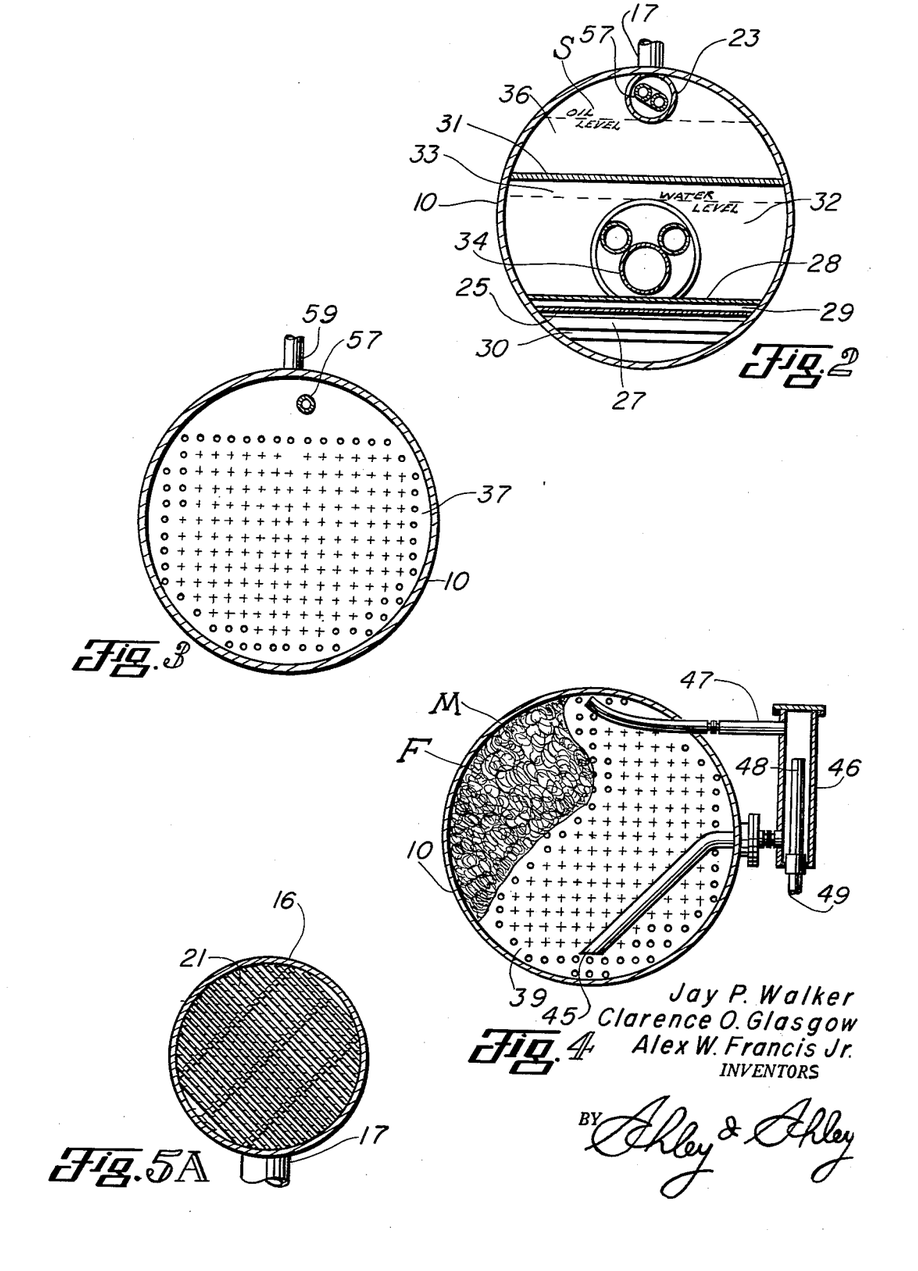
Figs. 2, 3 and 4 are horizontal cross-section views taken on the respective lines on Fig. 1, and looking in the direction of the arrows.
Fig. 5A is an enlarged transverse sectional view through the separator.
Figure 5:
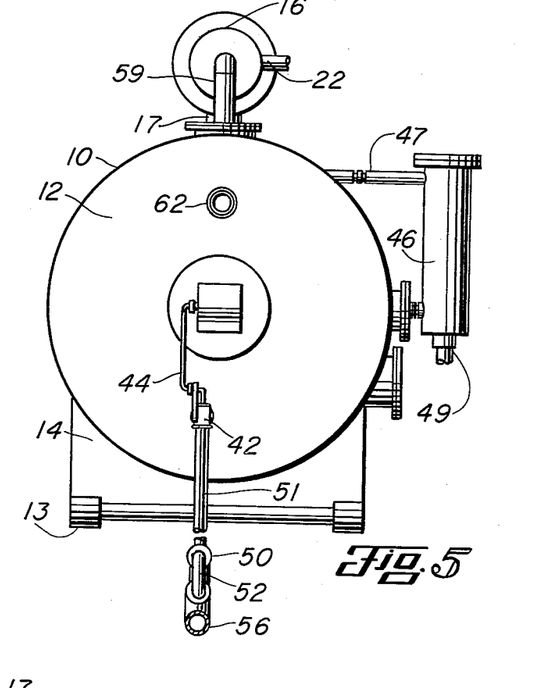
Fig. 5 is a rear end elevation of the treater.
Figure 6:
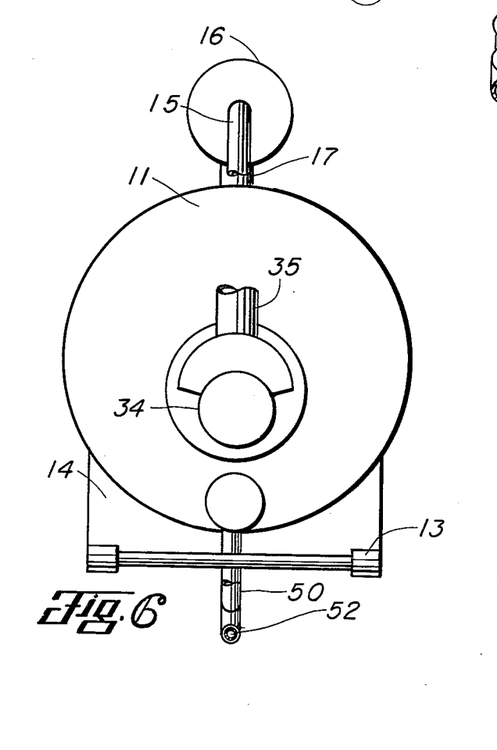
Fig. 6 is a front end elevation.

The separated gas and vapors and the liquids escape from the shield 19 through openings 20 into the cylindrical body of the separator and the liquids flow down through the nipple 17 into the top of a cylindrical drum 23. The gas and vapors flow rearwardly between plates 21 to a gas outlet elbow 22. The plates 21, as is best shown in Fig. 5A are closely spaced and inclined at an angle of about sixty degrees. The gas separator may be of any suitable construction and the structure shown is similar to that illustrated in the patent to Philip Dixon, No. 2,349,944, for Method of and Means for Separating Liquid and Gas or Gaseous Fluid, dated May 30, 1944. The plates have transverse ribs 21' and notches 20' at their lower edges. Liquids precipitated during the passage of the vapors and gas between the plates are collected and guided by the ribs to the lower edges of the plates. These liquids pass through the notches and flow along the bottom of the separator to the nipple 18, from which they flow down into the drum 23.

The drum 23 is secured against the top central portion of the tank and extends longitudinally thereof, the nipple 17 discharging the well liquids into the forward end of said drum. This drum, as hereinafter set forth, may be designated as a heat exchanger or condenser. A flume 24 extends from the bottom of the drum down to the bottom portion of the tank and terminates in an elbow 24', whereby the well liquids are directed forwardly under a horizontal spreader hood 25, through the rear end of which the flume extends. This hood extends transversely from wall to wall of the tank and has a depending flange 26 along its rear edge which functions to retain liquids under the hood.

A horizontal plate 28 is spaced above the hood and has its forward end overhanging the front edge of said hood, whereby a broad shallow passage 29 is formed therebetween. A transverse apron or flange 27 depends from the forward edge of the hood in front of a skimmer bar 27' which is spaced below the top of the hood and projects below said flange. The plate has a skirt 30 depending below the apron 27 and spaced therefrom so that oil escaping from under the apron 27 is caused to rise into the passage 29. Just above the center of the tank, a transverse baffle plate 31 has its side edges secured to the side walls of the tank. A vertical end wall 32 extends across the tank and depends from the rear end of the plate 31 immediately in front of the flume 24.

The front edge of the plate 31 terminates relatively above the skirt 30. The hood 25, the plate 31 and end wall 32, coacting with the side walls of the tank constitute a heating chamber 33. A return flue type of heater 34 is mounted in the head 11 and extends longitudinally in the chamber so as to overlie the baffle plate 28. This type of heater, preferably gas fired, has a stack 35 outside of the tank. A water level is carried in the tank just below the plate 31, so that the heater is constantly immersed in a body of water.

The trapping of the oil under the hood 25 is quite important. The body of water above and below the hood will be sufficiently heated to heat the inflowing emulsion and since this emulsion is spread out under the hood in a comparatively thin stratum, it will be partially broken and considerable water will drop out. The flow time from the flume 24 to the apron 27 in coaction with the spread, will also be sufficient length to permit quantities of water to settle out of the emulsion. Of course, such free water as flows down the flume will quickly settle to the bottom of the tank. By this arrangement the volume of liquid which would otherwise reach the heating chamber 33, is greatly reduced. In most cases such a large proportion of the water is separated from the oil below the hood, that a relatively small quantity of water will be carried into the heating chamber and substantially all of such water, so carried, will be emulsified with the oil or carried in suspension.

The emulsified oil which escapes under the lower edge of the apron 27 is deflected by the skirt 30 and caused to rise and flow into the forward end of the passage 29. As will be seen in Fig. 2, both the passage 29 and the space immediately under the hood 25, are wide, both transversely and longitudinally of the tank. Since the plate 28 is close to the heater 34 the oil emulsion flowing rearwardly through the passage 29, due to its broad area, will be heated or preheated, thus warming the top of the hood and thereby setting up heat exchange with the stratum of oil trapped below said hood; however, since the elements are all immersed in a body of heated water, a constant source of heat exchange, with the hood as a medium, is maintained.

From the time the liquid stream enters the drum 23 until it spreads under the hood 25 it is gradually heated; however, this heating is not of such degree as to raise the temperature of the free water, entrained in the stream, to a point where it will not readily drop out or precipitate to the bottom of the tank, after discharge from the lower end of the flume 24. The spread and travel of the liquid under the hood 25, from the flume to the passage 29, is of sufficient amplitude to not only gradually step up its temperature during such travel, but to increase the rate of heating quite rapidly, so that when the emulsified oil discharges from the rear end of the passage 29, it will be fully prepared for the emulsion breaking step in the chamber 33. Further, so much of the water will have been separated from the flow that the water-to-oil ratio will be very low and consequently the volume of liquid flowing into the chamber 33 will be greatly less than the volume of liquid which discharged from the flume; in some instances the volume will have reduced from 30% to 60%.

The emulsified oil escaping from the rear end of the passage 29, rises in the rear portion of the heating chamber 33. The overhanging plate 31 causes such oil to flow generally forwardly along the heater 34, whereby the oil is heated to an optimum temperature in the hot water. This last step constitutes the final heating of the emulsion and the major breaking step. The treated oil escaping from under the forward edge of the plate 31, rises into and flows rearwardly in the upper forward portion of the tank, which constitutes a flow passage 36.

Water which is separated from the oil in the chamber 33 of course mixes with the body of water therein and as the water cools throughout the tank it settles to the bottom thereof and is carried off, as hereinafter described. Water may settle down through the space between the apron 30 and the front end 11 and some water may move forwardly on top of the plate 28. Since the wall 32 completely closes the rear end of the heating chamber 33 and the water level is below the baffle plate 31, the possibility of thermo-syphonic flow of the water through the chamber and under the hood 25 or over the plate 31 is defeated.

In many operations oil-water droplets or globules are carried in suspension in the oil flowing into the passage 36 and in order to obtain clean oil, it is necessary to filter the oil and break up these globules, whereby the water is released and coalesced. These droplets or globules in many instances being minute or even microscopic in size, filtering becomes very important. When the oil-water globules are broken, the water is coalesced into sizeable droplets which have sufficient specific gravity to cause them to take a downward course.

A vertical medial partition 37 has its periphery secured to the inner cylindrical wall of the tank. This partition separates the front heating, and settling section of the tank from the rear filtering and refining section thereof. Since the water level is usually just below the plate 31, an upright, transverse baffle 38 may be mounted across the tank between the flume 24 and the partition 37. This baffle acts to hold back the hot oil and cause it to overflow said baffle in a thin layer or sheet or skimming effect, whereby a final gas releasing phase is had before the oil flows through the perforations of the partition 37. The lower portion of the baffle terminates a substantial distance below the water line and has its upper edge just below the oil level so as to hold a substantial body of heated oil under the drum 23. The partition 37 is imperforate to a line well below the top of the baffle 38 or intermediate the water and oil levels and below this line the entire partition is perforated. The oil which overflows the baffle 38 passes through the perforated portion of said partition. The water also flows through the lower perforated portion of the partition.

A second upright, transverse, perforated partition 39 extends across the tank and is spaced rearwardly of the partition 37, whereby a filtering chamber F is formed. Wood excelsior or other suitable filtering material M is placed in this chamber and the oil and water must flow through this filter before escaping from the tank. Such filters are well known and their purpose is to break up oil droplets, release additional water and coalesce the minute water droplets. An overflow partition 40 extends across the tank between the head 12 and the partition 39 and terminates below the top of the tank. The top edge of this partition constitutes a weir 41 which determines the oil level throughout the tank.

An oil outlet nipple 42' leads from the lower portion of the head 12 to an outlet valve 42. A float 43 in the tank between the head 12 and the overflow partition, has outside linkage connections 44 with the valve, whereby said valve is opened and closed to control the discharge of the oil from the tank. The water does not pass the partition 40, but is carried out through a water discharge pipe or syphon leg 45 leading through the side of the tank. The water level in the tank is maintained by any suitable means. It is preferable to connect the outer end of the leg 45 (Fig. 4) in the bottom of an upright syphon box 46 having a pressure equalizing pipe 47 extending into the top of the tank. A vertical overflow nipple 48 in the box has its lower end extending through the bottom of said box and determines the water level in the tank. A water discharge line 49 leads from the bottom of the nipple.

While the well stream leading to the separator 16 by way of the pipe 15, may be preheated in any suitable manner or not preheated, it is preferable to conduct the heated, washed oil from the valve 42 to a preheater or heat exchanger 50 by way of a pipe 51. The preheater shown, includes generally, a return tube 52 having a well stream inlet 53 at one end and is connected at its opposite end with the inlet pipe 15, by means of a collar 54. A U-shaped jacket 55 surrounds the legs of the tube and has one leg connected with the oil inlet pipe 51 and its opposite end with an outlet elbow 56 in its lower leg.

The handling of the gas and vapors in the treater is unique. The gaseous vapors which rise from the hot oil in the forward half of the tank are trapped by the imperforate upper portion of the partition 37 in a gas space S and caused to enter one end of a return bend tube 57 in the drum 23. The opposite end of this tube extends through the partition 37 into a vented box 58 on the rear side of the partition 37. The warm or hot gases and vapors evolved in the gas space S, enter and pass through the tube 57 in heat exchange relation with the much cooler emulsion flowing through the drum 23 and thus valuable hydrocarbon components are condensed. The residual gases and vapors are discharged into the box 58.

The free gas escapes into the filter section from the top of the box and enters an elbow 59 through a screen 60 at the top of the tank. The elbow connects with the rear end of the separator 16. A drain pipe 61 leads from the bottom of the box 58 down into the filtering material M below the water line; thus any liquid hydrocarbons recovered from the vapors, finally admix with the clean oil and tend to raise its gravity rating. Any water vapor condensates carried from the condenser tube 57 into the box 58 will also flow down through the tube 61 and admix with the stratum of water. By condensing the water vapors, the water content of the treated oil is reduced.

Because of the oil level maintained in the tank and the imperforate upper portion of the partition 37, the gas space S is provided in the forward end of the tank in which space hydrocarbon gas and vapors will accumulate and owing to the heat generated by the heater 34, water vapors may be released in said space. Since the inlet to the tube 57 is at the rear end of the drum 23, the entrance to the oil flow passage 36 at the front of the tank and the drum 23 is suspended in, and extends throughout the major portion of the length of said space, the gas and vapors will flow rearwardly toward the inlet to said tube 57. Those vapors and gas which contact and flow rearwardly along the outer surface of the drum, will be cooled to some extent by heat exchange, whereby any condensates, whether they be hydrocarbons or water, will precipitate to the oil zone; however, the major condensing will occur in the tube 57.

Manways are located in the tank wall at various points to give access to the different elements of the treater. As many of these manways may be installed as is deemed necessary. This is a common practice in emulsion treaters. It is well known that quiescence during certain stages of emulsion treating is highly desirable since agitation tends to retard breaking and settling of the water. This agitation not only causes tightening of the emulsion under some conditions but produces foaming. It is therefore desirable to get rid of the gas but at the same time not to lose the valuable liquefiable hydrocarbon components. Of course, where the well stream is preheated and its temperature thus raised, the tendency is to release some of the gas therein. By use of the separator 16 free gas flowing with the well stream is released when the stream is discharged into the shields 19. Both the gas and the liquids pass out through the outlets 20 into the body of the separator. The gas flows between the closely spaced baffle plates 21 and owing to their ribbed structure subject the streams of gas are sufficiently interrupted to scrub out liquefiable components. These components accumulate in the bottom of the separator and pass out through the nipple 18 into the drum 23. The gas which has been scrubbed is carried off from the outlet 22. In this manner the emulsion which accumulates in the drum 23 is substantially or approximately free from gas except such gas as is in solution with the oil and, therefore, agitation and foaming are reduced if not entirely eliminated.

The emulsified oil and free water pass down through the flume 24 and any gas which may escape will, of course, flow in a reverse direction up the flume and into the drum from which it may escape by the nipple 18. The liquids which flow down the flume are discharged under the hood 25 and since this hood is a substantial distance above the bottom of the tank the free water will immediately settle to the tank bottom and flow along the same, not only maintaining a body of water in the tank but flowing through the partitions 37 and 29 to the water outlet pipe 45. The hood 25 will have an area of several square feet and therefore adequate opportunity is given the emulsified oil to spread under the hood, whereby a partial breaking and settling out of considerable or the major portion of the water will take place. There will be heat exchange from the heated water above the hood which will tend to heat the oil stratum under the hood and thus accelerate the precipitation of water. The oil which flows under the apron 27 and enters the passage 29 will flow through a circuitous path which leads rearwardly from the skirt 30, then forwardly along the heater 34 and then rearwardly above the plate 31. During this travel path the oil will be thoroughly heated and the emulsion broken.

Gas and vapors which accumulate in the space S will freely enter the tube 57 and flow therethrough in heat exchange relation with the cooler emulsion flowing through said drum. This heat exchange will cause some of the gaseous vapors to condense and admix with the condensates and be discharged into the box 58. Since the top of the box is vented the gas will readily escape to the elbow 59 and then to the separator and outlet 22. The condensates will pass down through the pipe 61 and admix with the water and rise into the clean oil. The filtering chamber F between the partitions 37 and 39 is quite large and therefore will contain a large quantity of filtering material. This will assure not only a thorough filtering of the water but also of any oil and oil droplets will be efficiently broken so that the oil which overflows the weir 41 will be substantially free of water. Water droplets suspended or coalesced in the oil zone or stratum will move rearwardly and gravitate toward the water stratum or zone, such droplets flowing through the filter section will be broken up and admixed with the water and while they will cross-flow the oil, there will be no counterflow. Since the filtering material M extends vertically through the entire horizontal water stratum, no water can escape through the leg 45 without passing through the filtering material; consequently, any fine particles of oil suspended in the water stratum will be arrested and coalesced into oil bodies having sufficient buoyancy to ascend into the oil stratum. By this filtering and coalescing much cleaner water will be discharged from the tank.

Because of the weir 41 and the float 43, which operates the oil outlet valve 42, the oil level in the accumulating chamber C will be much lower than the weir. This is a very important feature because it provides a flexible oil level between the weir and the oil outlet and assures stabilization of the oil and water zones or strata forwardly of the partition 40. An overflow or an underflow of the influent streams into the tank will not in any way affect the oil level controlled by the weir 41. A surge of oil into the chamber C will be compensated because of the large cubical area between the weir and the normal oil level. A collar 62 is mounted in the head 12 near the top of the tank and a suitable safety valve (not shown) may be mounted on this collar outside the tank. A gas space S' will be formed in rear of the partition 37 above the oil level and above the oil level in the chamber C and a predetermined excessive gas pressure in this space will be relieved through the safety valve.

A horizontal type of emulsion treater possesses many advantages over a vertical or upright type. Where it is necessary to brace an upright treater by means of cables and the like, no such bracing is required with a horizontal type. Another advantage is that the horizontal type may be easily unloaded from a truck and does not require erection; whereas, a vertical type must be unloaded in a horizontal position and then raised to a vertical position which is not only a laborious procedure but often a dangerous one. Another advantage is that all of the manways are comparatively close to the ground and may be readily reached and the workman is not required to use long ladders or carry material up and down the same. Where the horizontal tank is 10 feet in diameter as a rule, all of the manways would be within 5 or 6 feet of the ground; whereas, in a vertical type they may be from 10 to 30 feet from the ground.

Figure 7:
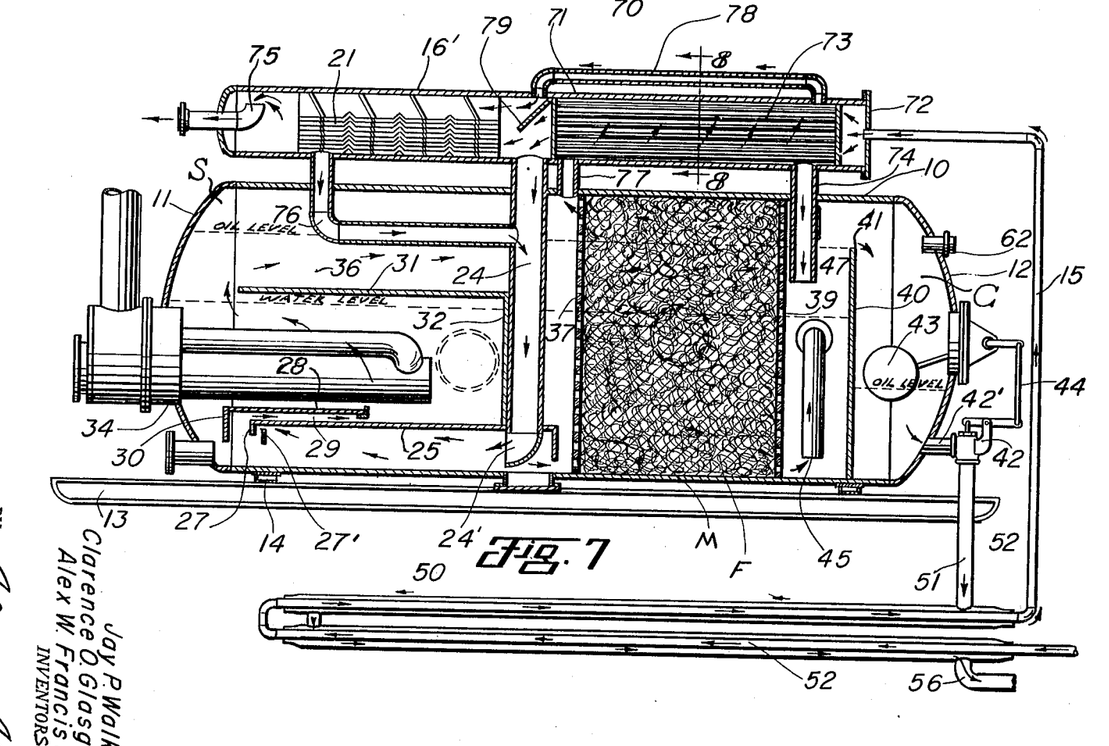
Fig. 7 is a view similar to Fig. 1 showing a modified form of the invention and including a preheater.
Figures 8, 9:
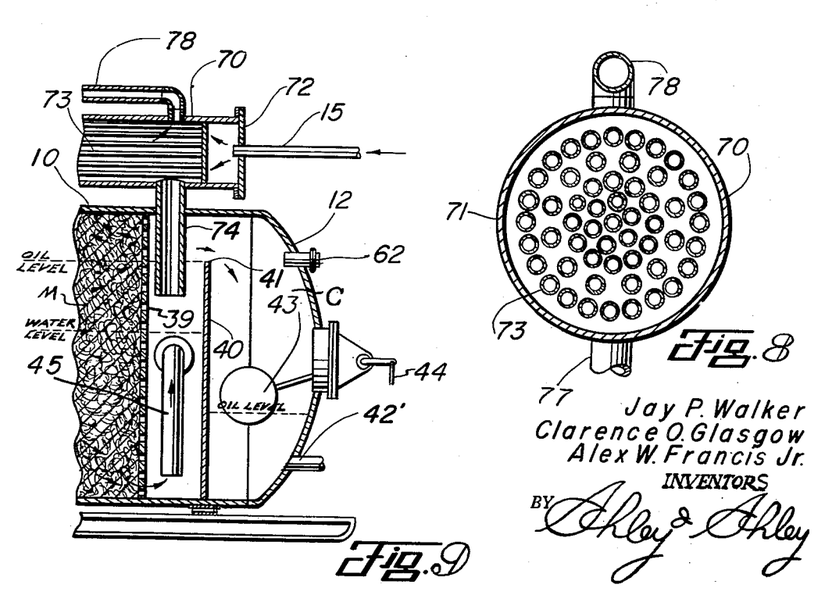
Fig. 8 is a transverse sectional view taken on the line 8—8 of Fig. 7.
Fig. 9 is a vertical sectional view of the rear portion of the treater shown in Fig. 7 wherein the preheater is omitted and the influent stream is taken directly into the condenser.

In Figs. 7 and 8 we have shown another form of horizontal treater which includes most of the features of the form which has been described but involves certain deviations which will be explained in detail. In this form as well as in those shown in Figs. 9 to 12, inclusive, the partition 37 is perforated to the top of the tank and thus the gas space S is continuous throughout the length of the tank. The baffle 38 and the drum 23 are omitted. The plate 28 has its rear end terminated a substantial distance from the rear end of the heater 34 which permits the emulsion to flow upwardly and directly contact the rear end of said treater as it rises in the heating chamber 33. The preheater 50 is reversed and the tube 52 is made substantially the same diameter as the influent pipe 15 which is at the rear end of the treater.

In lieu of the drum 23 a condenser 70 is mounted on the rear portion of the tank above the filter section. This condenser includes a cylindrical drum or shell 71 having a flat head 72 through which the pipe 15 extends. A tube bundle 73 is mounted in the shell and spaced from the head 72 and is of any suitable construction so long as it provides spaced longitudinal tubes through which the influent flows. Adjacent the rear end of the condenser a discharge pipe 74 extends from the bottom of the shell down into the tank and terminates in the oil zone below the oil level for conducting condensates to the oil zone at a point adjacent the weir 41.

The influent from the tube bundle 73 discharges into the rear end of a gas separator 16' somewhat similar to the separator 16 in that it has the same inclined baffle plates 21. The liquids discharged from the condenser fall into the flume 24 which is connected to the bottom of the separator 16'; while the gases move forwardly between the baffle 21 and escape into an elbow 75 which extends through the forward end of the separator and may be connected to a suitable conductor (not shown). Any condensate collected in the separator is carried from the forward portion thereof by a right angular conductor 76 extending down into the tank and connected into the side of the flume above the oil line. The hot gases and vapors accumulating in the space S are conducted from the rear end thereof to the forward end of the condenser shell 71 by means of a nipple 77. Gas and vapor evolved in the condenser are conducted from the top thereof by a pipe 78 extending from the rear portion of said condenser to the rear portion of the separator 16' and are discharged into the latter downwardly toward an inclined baffle 79 which prevents mixture with the liquids being discharged from the tube bundle.

The operation of this form of the treater is substantially the same as that shown in Figs. 1 to 6, inclusive, except insofar as the condensing of the vapors is concerned. In the form under discussion, the influent stream is brought into heat exchange relation with the hot gas and vapor prior to the separation of gas. The gases and vapors which enter the condenser through the nipple 77 will, of course, contact the tubes of the bundle 73 which are cooled because of the influent which flows therethrough, which although being preheated, has a temperature considerably lower than the temperatures of these gases and vapors. If the gas from the condenser is cooled to approximately the same temperature as the gas in the separator 16', there will be no further condensation thereof; however, if the gas entering the separator through pipe 78 is hotter than the gas in the separator, there will be further condensation after this gas is commingled with the colder gas in said separator and the condensate therefrom will be carried down through the pipe 76 and admixed with the liquids flowing down the flume 24. The condensates from the condenser being delivered to the oil stratum adjacent the weir 41 will be readily carried over said weir into the accumulating chamber or reservoir C.

In Fig. 9 we have another form similar to the form shown in Figs. 7 and 8 with the exception that the preheater 50 is omitted. In this form the inlet pipe 15 is connected directly into the head 72 and the influent stream is, of course, not preheated. Some emulsions reach the treater at a sufficient temperaure as not to require preheating and in some instances gas is separated from the stream before it is conducted to the treater.

In the forms shown in Figs. 7, 8 and 9 there is, of course, no separation of gas from the influent stream before the latter is carried through the condenser or before the liquids are discharged into the flume of the treater, thus these forms of the treater are best adapted to treating where little gas comes to the treater or the gas is removed in advance. Where the influent comes direct to the condenser without preheating, the gases and vapors are subjected to the coldest possible fluid in this type of treater.

Figure 10:
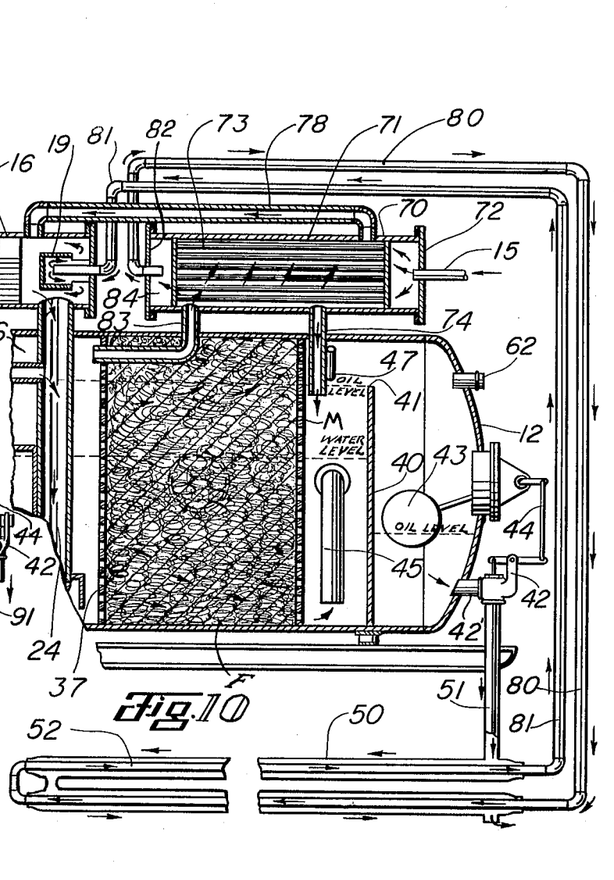
Figs. 10, 11 and 12 are each a longitudinal vertical sectional view of the rear portion of a modified form of treater constructed in accordance with the invention.

In Fig. 10 we have shown another arrangement of exterior condenser wherein the influent comes direct to the condenser as in Fig. 9; however, the influent after passing through the condenser and subjecting the gases to its low temperature is carried by a conductor 80 to the tube 52 of the preheater 50 which is arranged in the same manner as is shown in Figs. 7 and 8. A discharge pipe 81 leads from the preheater to the rear end of the separator 16 which is substantially the same as the separator in Fig. 1 except that it is reversed and the cylindrical shield 19 is at the rear end instead of at the forward end of said separator. Otherwise, the separator has the same connections as in Figs. 7, 8 and 9, with respect to the elements 24, 75 and 76.

In this form the influent stream is first subjected to heat exchange, is then conducted through the preheater and is then discharged into the separator 16 whereby gas is separated from the well liquids before they are discharged into the flume 24 and carried into the treater tank. The condenser is substantially the same as that shown in Figs. 7, 8 and 9 with the exception that it is not connected directly to the separator; and in addition to its shell 71, head 72, condenser bundle 73 and gas conductor 78 connecting it with the separator, it has a front head 82 from which the pipe 80 extends. Since the exterior condenser 70 is spaced further to the rear than the condenser in Fig. 9, an angular conductor 83 is employed instead of the nipple 77. This conductor extends from the bottom of the forward end of the condenser down into the tank and forwardly through the filtering material M and then through the upper portion of the partition 37 so as to discharge into the gas space S. In the condenser shown in Fig. 10 there is a manifold space 84 between the tube bundle 73 and the inlet to the pipe 80. This form is desirable where it is desired to employ the influent stream at the lowest temperature for condensing purposes.

Figure 11:
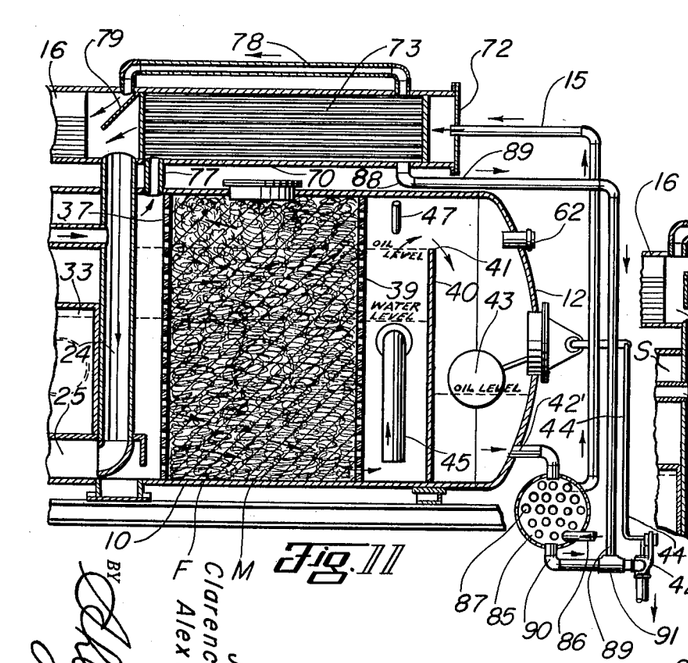

In Fig. 11 we have shown still another form wherein the emulsified stream to be treated enters a coil type preheater 85 through an inlet pipe 86 connected to the coil bundle 87 thereof. The influent pipe 15 leads from the coil bundle 87 to the head 72 of the exterior condenser 70, which is substantially the same as the form shown in Fig. 7, and the same reference numerals will be used in connection therewith. However, instead of the condensate discharge pipe leading down into the tank, an elbow 88 is connected to the condenser and a pipe 89 leads from this elbow. The jacket of the preheater has a discharge pipe 90 and the pipe 89 is connected in the pipe 90 by means of a T 91. In this form of treater the condensate from the condenser is conducted into the clean oil discharge after the oil has been through the heat exchanger and is thus at a considerable lower temperature. This condensate will be introduced into the cooled oil at a temperature somewhat equal to the temperature at which condensation occurred and thus, there will be very little chance of any of this condensate reverting to the gaseous phase, and all of such condensate would be expected to remain in the liquid phase, and thus give a slightly increased gravity over the other forms hereinbefore described.

Figures 12, 13:
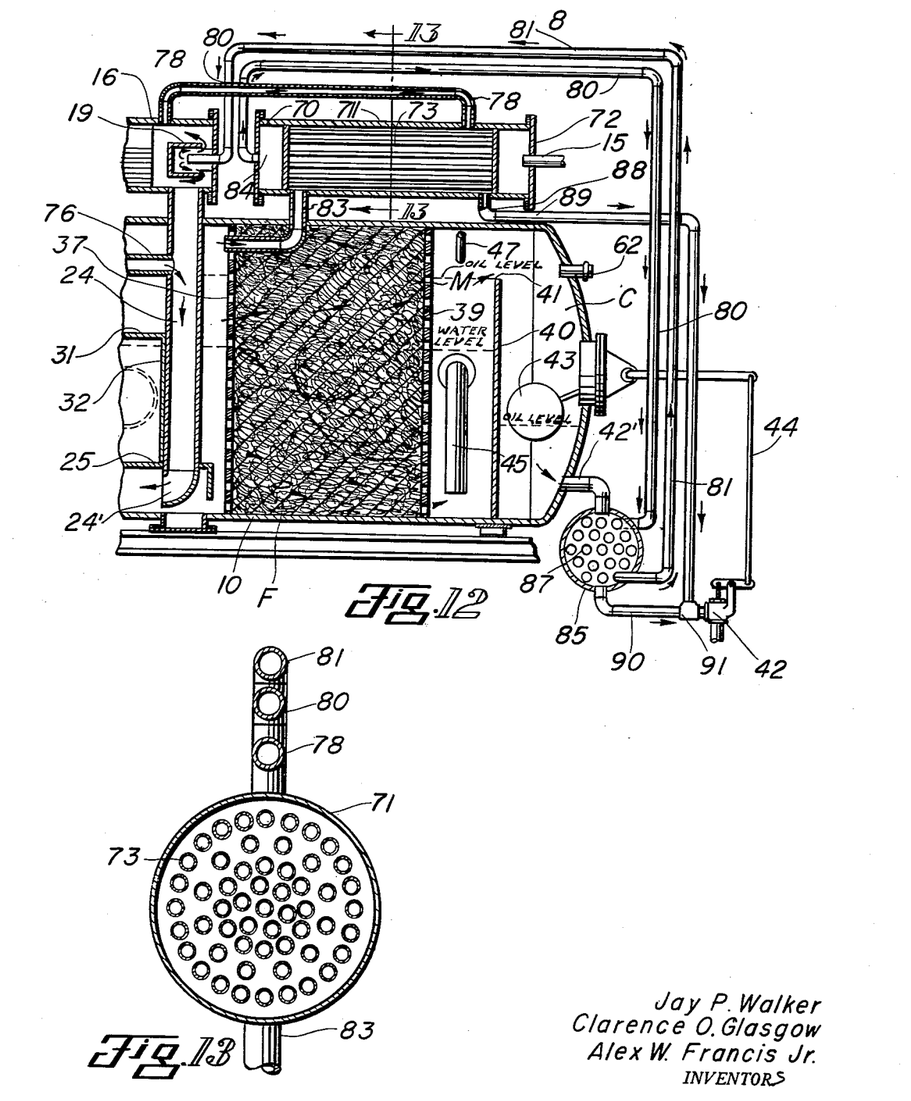
Fig. 13 is a transverse sectional view taken on the line 13—13 of Fig. 12.

Fig. 12 shows a combination of the forms illustrated in Figs. 10 and 11, with the exception that the pipe 80 is connected to the preheater 85 instead of to the preheater 50, and the influent pipe 15 is connected directly to the condenser and the pipe 81 leads from the coil bundle 87 to the separator 16 as in Fig. 10. While this form involves the lowest influent temperature for condensing purposes, it also has the advantage of separating the gas from the influent before the latter enters the treater tank. Where it is desired to obtain maximum condensation, this form is very desirable.

Figure 14:
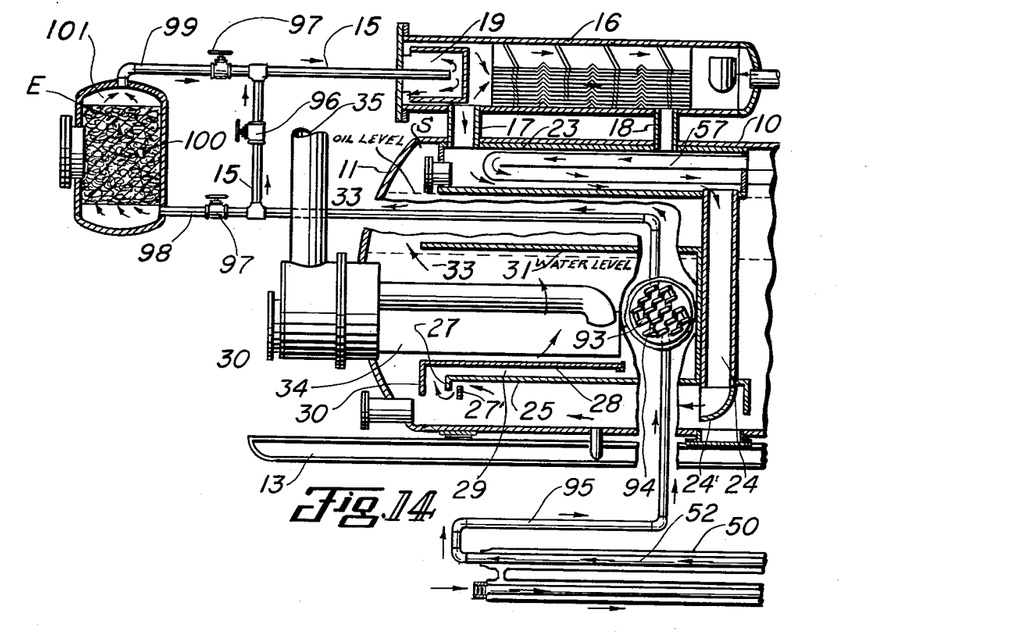
Fig. 14 is a longitudinal vertical sectional view of the front portion of an emulsion treater showing still another modified form of the invention.

Some emulsified oils have a tendency to foam, particularly those of low gravity. In Fig. 14 we have shown a treater arrangement especially adapted to such oils. It will be noted in several of the figures, that a manway 93 is provided in the tank at the rear of the heater 34 in the heating chamber 33. The cover to this manway is removed and a coil bundle 94 is inserted in the chamber 33. The influent pipe 15 is connected to this coil which in turn is connected by a conductor 95 with the discharge end of the tube 52 of the preheater 50. Since the oils being treated involve considerable gas in solution, it is obvious that by stepping up the temperature of the influent stream after it leaves the preheater 50 and before it enters the separator 16, a greater amount of gas will be separated in said separator. While this arrangement is usable in treating foamy oils because it releases gas in solution, it can also be used where it is desired to increase the gasoline content of the gas removed from the treater or where the oils being treated do not give off sufficient gas for firing the treater and for lease uses.

Where extremely foamy oils are encountered, a cut-off valve 96 in the conductor 15 is closed and valves 97 in lines 98 and 99 are opened, the lines 98 and 99 being connected to the conductor 15 on opposite sides of the valve 96. The line 98 leads into the bottom of a filtering vessel 100 which has screens 101 therein with filtering material, such as excelsior E, between the screens. The line 99 leads from the top of the vessel so that the liquids heated in the exchanger 94 are bypassed through the filtering material which tends to break up the oil-water globules and to cause the foaming particles to break down, so that when the stream reaches the separator, the gas will readily separate from the liquids and the foaming will be reduced to a minimum. The vessel 100 will eventually become filled with water, but this will not interfere with the operation. When it is not desired to use the vessel, the valves 97 are closed and the valve 96 is opened.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. In an emulsion treater, an elongate horizontal treating tank having an emulsion inlet, a water knockout compartment in the tank into which the emulsion inlet opens, an elongate continuous horizontal settling chamber in the tank, said chamber occupying substantially the entire vertical cross-section of the tank for a substantial portion of the length of the tank so as to provide a large settling chamber of considerable length, a heater in the tank for heating the emulsion stream, emulsion discharge means leading from the water knockout compartment to the heater, heated emulsion discharge means leading from the heater directly to the settling chamber, means for maintaining an oil level in the settling chamber and holding in said chamber a horizontally elongate continuous stratum of oil, the heated emulsion discharge means conducting the heated emulsion stream directly and immediately from the heater to said oil stratum, means for maintaining a water level below the oil level, a water outlet from the tank, an oil discharge at one end of the oil stratum, a filter in the tank closely adjacent the oil discharge and extending through the oil level at points spaced horizontally from the oil discharge whereby the oil must pass horizontally through the filter before being discharged from the tank, and a gas outlet from the tank.

2. In an emulsion treater, an elongate horizontal treating tank having an emulsion inlet, a water knockout compartment in the tank into which the emulsion inlet opens, said compartment being adjacent one end of the tank, an elongate continuous horizontal treating chamber in the tank, said chamber occupying substantially the entire vertical cross-section of the tank for a substantial portion of the length of the tank so as to provide a large continuous treating chamber of considerable length, a heater in the tank for heating the emulsion stream, emulsion discharge means leading from the water knockout compartment to the heater, heated emulsion discharge means leading from the heater directly to the treating chamber, means for maintaining an oil level in the treating chamber and holding in said chamber a horizontally continuous stratum of oil, the heated emulsion discharge means conducting the heated emulsion stream directly and immediately to said oil stratum, means for maintaining a water level below the oil level, a water outlet from the tank, an oil discharge at one end of the oil stratum, a filter in the tank closely adjacent the oil discharge and extending through the oil level at points spaced horizontally from the oil discharge whereby the oil must pass horizontally through the filter before being discharged from the tank, and a gas outlet from the tank.

3. In an emulsion treater, an elongate horizontal treating tank having an emulsion inlet, a water knockout compartment in the tank into which the emulsion inlet opens, an elongate continuous horizontal settling chamber in the tank, said chamber occupying substantially the entire vertical cross-section of the tank for a substantial portion of the length of the tank so as to provide a large settling chamber of considerable length, a heater in the tank for heating the emulsion stream, emulsion discharge means leading from the water knockout compartment to the heater, heated emulsion discharge means leading from the heater directly to the settling chamber, means for maintaining an oil level in the settling chamber and holding in said chamber an elongate horizontally continuous stratum of oil, the heated emulsion discharge means conducting the heated emulsion stream directly and immediately from the heater to said oil stratum, means for maintaining a water level below the oil level, a water outlet from the tank, an oil discharge at one end of the oil stratum, a filter in the tank closely adjacent the oil discharge and extending through the oil level at points spaced horizontally from the oil discharge whereby the oil must pass horizontally through the filter before being discharged from the tank, and a gas outlet from the tank, the oil stratum overlying the heater and the entire settling chamber in one continuous layer.

4. In an emulsion treater, an elongate horizontal treating tank having an emulsion inlet, a water knockout compartment in the tank into which the emulsion inlet opens, an elongate continuous horizontal settling chamber having a wall in common with the knockout compartment, said chamber occupying substantially the entire vertical cross-section of the tank for a substantial portion of the length of the tank so as to provide a large settling chamber of considerable length, a heater in the tank for heating the emulsion stream to a temperature sufficient to break down the emulsion stream into its water and oil components; emulsion discharge means leading from the water knockout compartment to the heater, heated emulsion discharge means leading from the heater directly to the upper portion of the settling chamber, means for maintaining an oil level in the settling chamber and holding in said chamber an elongate horizontally continuous stratum of oil overlying the heater and the entire settling chamber in one continuous layer, the heated emulsion discharge means conducting the heated emulsion stream directly and immediately from the heater to one end of said oil stratum, an oil discharge at the opposite end of the oil stratum, means for maintaining a water level below the oil level, a water outlet from the tank, a filter in the tank closely adjacent the oil discharge and extending through the oil level at points spaced horizontally from the oil discharge whereby the oil must pass horizontally through the filter before being discharged from the tank, and a gas outlet from the tank.

5. The method of treating oil well emulsion streams which includes, introducing the emulsion stream into a heating zone and therein heating the emulsion stream to a temperature sufficient to break down the emulsion into its water and oil components, flowing the stream directly and immediately from the heating step in an elongate horizontal continuously unidirectional path to a point of clean oil withdrawal, prior to withdrawal and subsequent to heating passing the stream horizontally through a filter to coalesce water and oil in concurrent flow paths and prevent the countercurrent flow of water and oil, withdrawing clean oil, and withdrawing separated water and gas.

6. The method of treating oil well emulsion streams which includes, introducing the emulsion stream into a heating zone and therein heating the emulsion stream to a temperature sufficient to break down the emulsion into its water and oil components, flowing the stream directly and immediately from the heating zone horizontally in a continuously unidirectional path to a point of clean oil withdrawal and through a large elongate horizontal body of well fluids of large volume, whereby the oil and water of the stream are separated and flow into separate strata in concurrent fashion as the stream passes to the point of clean oil withdrawal, and whereby countercurrent flow of oil and water is prevented, withdrawing clean oil, and withdrawing separated water and gas.

7. The method as set forth in claim 6 including the steps of separating gas from the well stream subsequent to the heating step, and passing all of the gas separated in the last step in indirect heat exchange with the influent emulsion stream prior to heating the latter.

8. The method of treating oil well emulsion streams which includes, flowing the emulsion stream through a first heat exchange zone, then flowing the stream through a second heat exchange zone, then introducing the stream into a heating zone and therein heating the emulsion stream to a temperature sufficient to break down the emulsion into its water and oil components, flowing the stream directly and immediately from the heating zone in an elongate horizontal continuously unidirectional path to a point of clean oil withdrawal, prior to withdrawal and subsequent to heating passing the stream horizontally through a filter to coalesce water and oil in concurrent flow paths and prevent the countercurrent flow of water and oil, withdrawing the water, withdrawing the clean oil and passing said oil in indirect heat exchange with the emulsion stream in the second heat exchange zone, separating gas from the well stream subsequent to the heating step, and passing all of the gas separated in the last step in indirect heat exchange with the emulsion stream in the first heat exchange zone to condense vapors from said gas, recovering the condensed vapors, and withdrawing the uncondensed gas.

9. The method as set forth in claim 8, and combining the recovered condensed vapors with the clean oil subsequent to the passage of the latter through the second heat exchange zone.

10. The method of treating oil well emulsion streams which includes, flowing the emulsion stream through a first heat exchange zone, then flowing the stream through a second heat exchange zone, then separating gas from the emulsion stream, then introducing the stream into a heating zone and therein heating the emulsion stream to a temperature sufficient to break down the emulsion into its water and oil components, flowing the stream directly and immediately from the heating zone in an elongate horizontal continuously unidirectional path to a point of clean oil withdrawal, prior to withdrawal and subsequent to heating passing the stream horizontally through a filter to coalesce water and oil in concurrent flow paths and prevent the countercurrent flow of water and oil, withdrawing the water, withdrawing the clean oil and passing said oil in indirect heat exchange with the emulsion stream in the second heat exchange zone, separating gas from the well stream subsequent to the heating step, and passing all of the gas separated in the last step in indirect heat exchange with the emulsion stream in the first heat exchange zone to condense vapors from said gas, recovering the condensed vapors, and withdrawing the uncondensed gas.

11. The method as set forth in claim 10 wherein the emulsion stream is passed in indirect heat exchange relationship with the heating zone prior to the first gas separation step.

12. In an emulsion treater, an elongated horizontal treating tank having an emulsion inlet, a water knockout compartment in the tank into which the emulsion inlet opens, an elongate continuous horizontal settling chamber in the tank, said chamber occupying substantially the entire vertical cross-section of the tank for a substantial portion of the length of the tank so as to provide a large settling chamber of considerable length, a heater in the tank for heating the emulsion stream to a temperature sufficient to break down the emulsion stream into its water and oil components, emulsion discharge means leading from the water knockout compartment to the heater, heated emulsion discharge means leading from the heater directly to the settling chamber, means for maintaining an oil level in the settling chamber and holding in said chamber a horizontally elongate continuous stratum of oil, the heated emulsion discharge means conducting the heated emulsion stream directly and immediately from the heater to said oil stratum, means for maintaining a water level below the oil level, a water outlet from the tank, an oil discharge at one end of the oil stratum, a filter in the tank closely adjacent the oil discharge and extending through the oil level at points spaced horizontally from the oil discharge whereby the oil must past horizontally through the filter before being discharged from the tank, a condenser carried by the upper portion of the tank having two separate heat exchange flow passages therein, an influent emulsion conductor connected to one of the heat exchange passages, the other end of the latter passage being connected to the emulsion inlet, a gas outlet from the tank connected to the other heat exchange passage whereby substantially all of the gas separated in the tank is conducted through said passage, an effluent gas conductor leading from the latter heat exchange passage, and a condensed vapor conductor leading from the latter heat exchange passage to the tank.

13. The method of treating oil well emulsion streams which includes, introducing the emulsion stream into a heating zone and therein heating the emulsion stream to a temperature sufficient to break down the emulsion into its water and oil components, flowing the stream immediately and directly from the heating zone into an elongate horizontal continuous stratum of oil, maintaining beneath the stratum of oil an elongate horizontal continuous stratum of water, maintaining the oil and water strata separate and distinct whereby intermingling of the oil and water is avoided, flowing the emulsion stream in an elongate horizontal continuously unidirectional path in the strata of oil and water to oil and water outlets and separating and stratifying the emulsion components in such path into the oil and water strata, withdrawing clean oil from the oil stratum, and withdrawing separated water and gas.

14. The method of treating oil well emulsion streams which includes, removing free water from the emulsion stream, introducing the emulsion stream into a heating zone and therein heating the emulsion stream to a temperature sufficient to break down the emulsion into its water and oil components, flowing the stream immediately and directly from the heating zone into an elongate horizontal continuous stratum of oil, maintaining beneath the stratum of oil an elongate horizontal continuous stratum of water, maintaining the oil and water strata separate and distinct whereby intermingling of the oil and water is avoided, flowing the removed free water to the water stratum, flowing the emulsion stream in an elongate horizontal continuously unidirectional path in the strata of oil and water to oil and water outlets and separating and stratifying the emulsion components in such path into the oil and water strata, withdrawing clean oil from the oil stratum through the oil outlet, and withdrawing separated water and gas.

15. The method of treating oil well emulsion streams which includes, establishing and maintaining elongate horizontal continuous superposed strata of oil and water with an interface therebetween, maintaining the oil and water strata separate and distinct without intermingling whereby the component of each stratum is excluded from the other stratum, introducing the emulsion stream into a heating zone and therein heating the emulsion stream to a temperature sufficient to break down the emulsion into its water and oil components, flowing the stream immediately and directly from the heating zone into the superposed strata of oil and water, then flowing the heated stream in an elongate horizontal continuously unidirectional path in the strata of oil and water and in such path separating and stratifying the emulsion components into the oil and water strata, withdrawing clean oil from the oil stratum, and withdrawing separated water and gas.

16. The method as set forth in claim 15, wherein the oil stratum is maintained overlying the heating zone, and the heated emulsion stream is flowed directly from the heating zone to a point adjacent the oil-water interface.

17. The method as set forth in claim 15, and filtering the oil stratum and at least the upper portion of the water stratum prior to withdrawal.

18. The method as set forth in claim 15, and passing the gas in heat exchange relationship with the emulsion stream prior to the heating of the latter to cool the gas and condense liquid therefrom, and returning the condensed liquid to the oil stratum.

19. The method as set forth in claim 15, and maintaining a blanket of gas at uniform pressure over the entire oil stratum.

20. The method of treating oil well emulsion streams which includes, establishing and maintaining elongate horizontal continuous superposed strata of oil and water with an interface therebetween, maintaining the oil and water strata separate and distinct without intermingling whereby the component of each stratum is excluded from the other stratum, removing free water from the emulsion stream, flowing the free water directly and horizontally into the lower portion of the water stratum, introducing the emulsion stream into a heating zone and therein heating the emulsion stream to a temperature sufficient to break down the emulsion into its water and oil components, flowing the stream immediately and directly from the heating zone into the superposed strata of oil and water, then flowing the heated stream in an elongate horizontal continuously unidirectional path in the strata of oil and water and in such path separating and stratifying the emulsion components into the oil and water strata, withdrawing clean oil from the oil stratum, and withdrawing separated water and gas.

21. The method of treating oil well emulsion streams which includes, establishing and maintaining elongate horizontal continuous superposed strata of oil and water with an interface therebetween, maintaining the oil and water strata separate and distinct without intermingling whereby the component of each stratum is excluded from the other stratum, introducing the emulsion stream into a heating zone and therein heating the emulsion stream to a temperature sufficient to break down the emulsion into its water and oil components, flowing the stream immediately and directly from the heating zone into the superposed strata of oil and water, then flowing the heated stream in an elongate horizontal continuously unidirectional path in the strata of oil and water and in such path separating and stratifying the emulsion components into the oil and water strata, flowing the oil and water strata horizontally in an elongate continuously unidirectional path, withdrawing clean oil from the oil stratum, and withdrawing separated water and gas.

References Cited in the file of this patent

UNITED STATES PATENTS

| Number | Name | Date |
|---|---|---|
| 2,122,310 | Burt | June 28, 1938 |
| 2,179,131 | Millard | Nov. 7, 1939 |
| 2,297,297 | Walker | Sept. 29, 1942 |
| 2,342,950 | Lovelady et al. | Feb. 29, 1944 |
| 2,349,944 | Dixon | May 30, 1944 |
| 2,457,959 | Walker | Jan. 4, 1949 |
| 2,474,475 | Glasgow | June 28, 1949 |
| 2,522,429 | Buchan | Sept. 12, 1950 |
| 2,528,032 | Candler et al. | Oct. 31, 1950 |
| 2,601,903 | Erwin | July 1, 1952 |
| 2,601,904 | Erwin | July 1, 1952 |